G. V. PORZ.
MEANS FOR FEEDING AND CUTTING ICE CREAM.
APPLICATION FILED SEPT. 15, 1919.
1,395,655.
Patented Nov. 1, 1921.
3 SHEETS—SHEET 2.
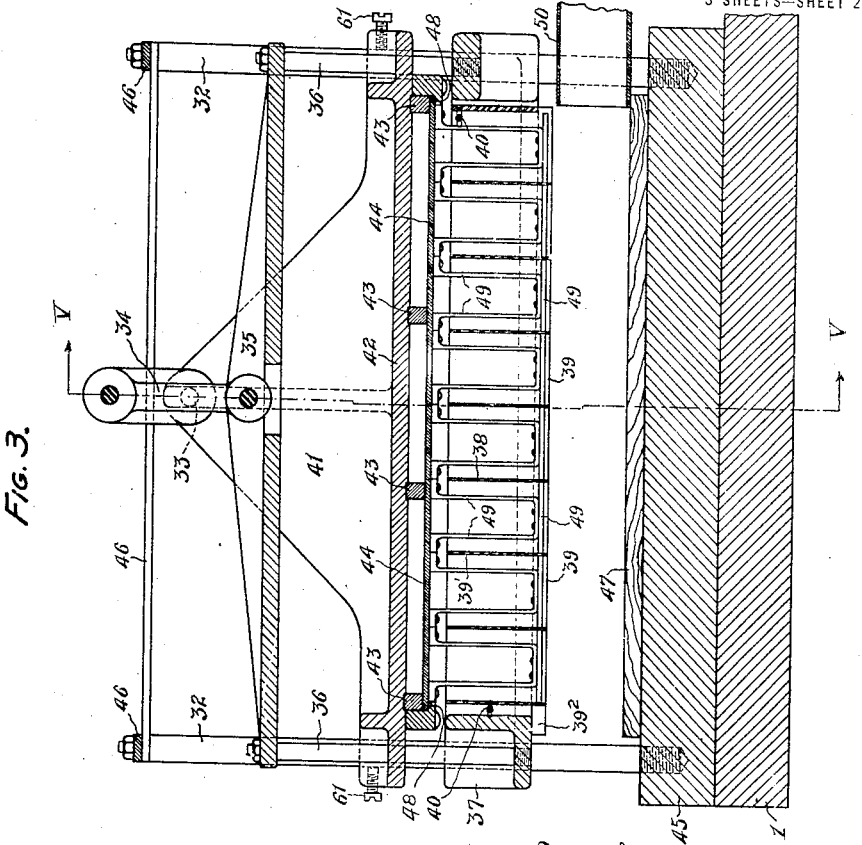
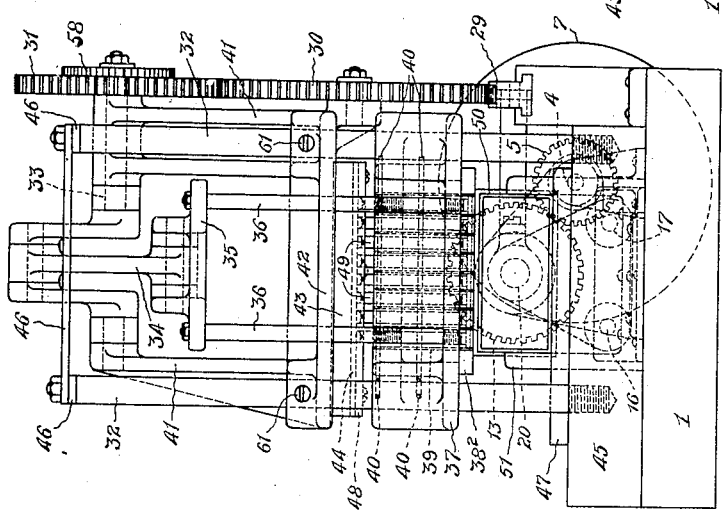
INVENTOR.
GEORGE V. PORZ
BY
ATTORNEYS

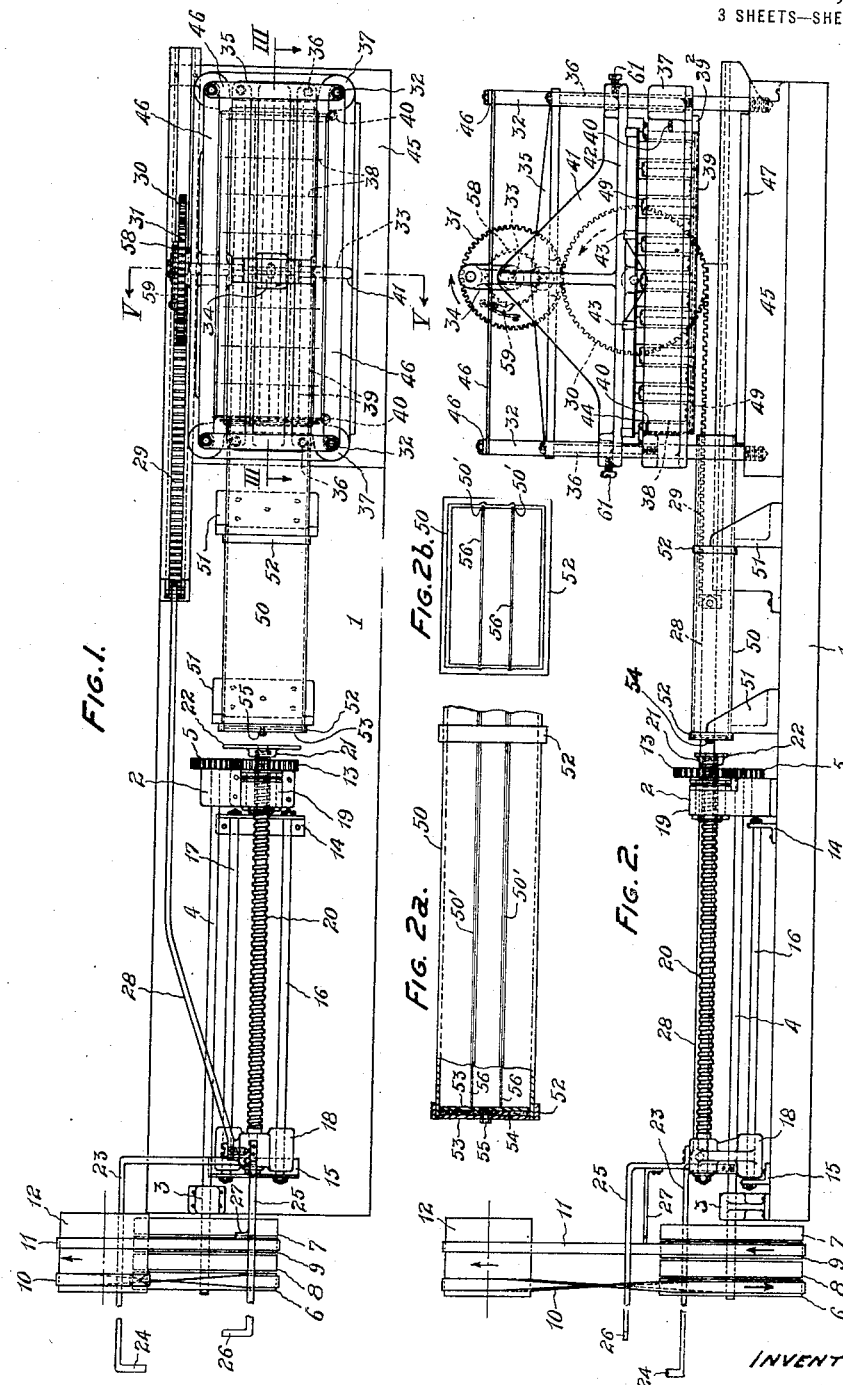

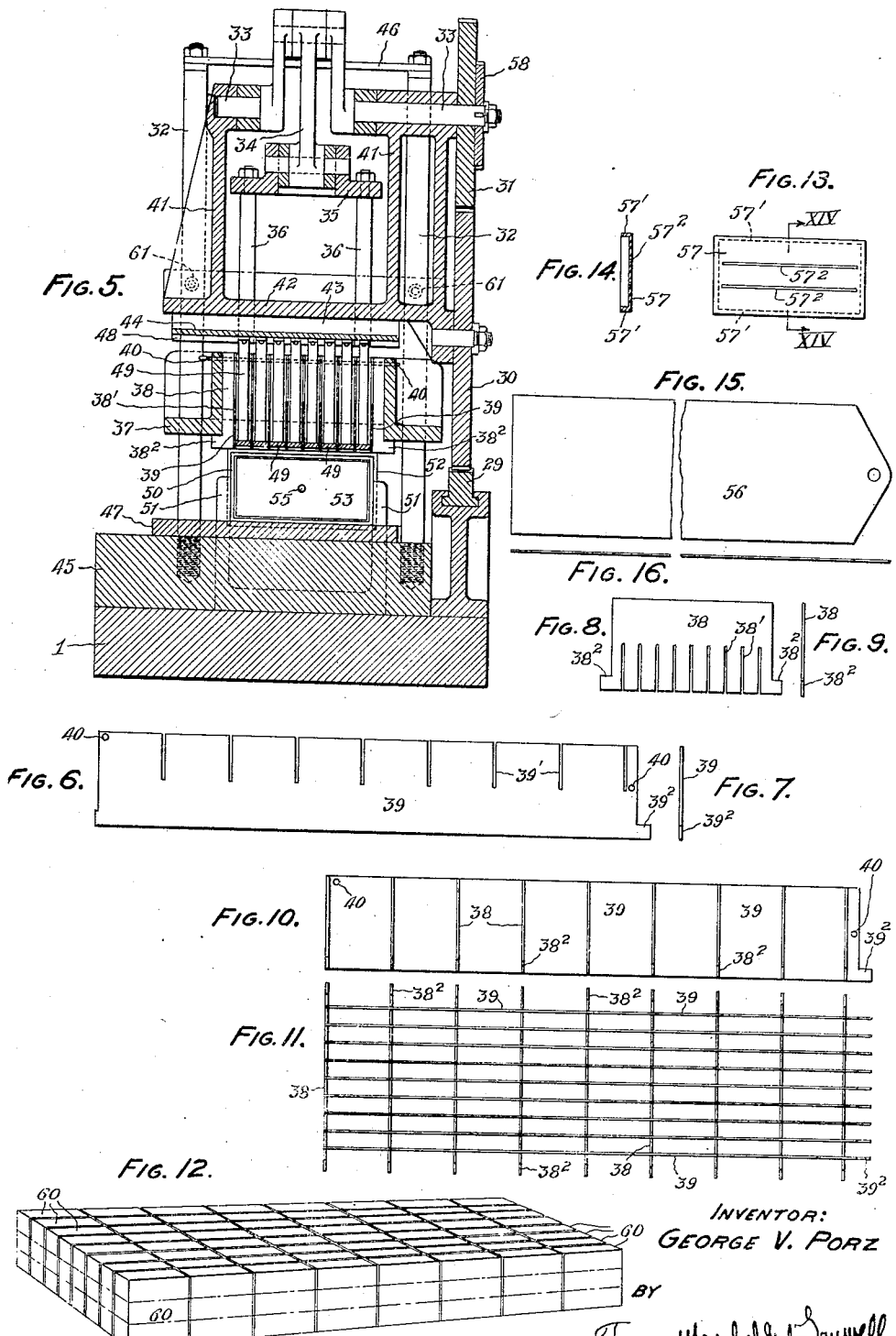

UNITED STATES PATENT OFFICE.

GEORGE V. PORZ, OF CLEVELAND, OHIO.

MEANS FOR FEEDING AND CUTTING ICE-CREAM.

1,395,655.   Specification of Letters Patent.   Patented Nov. 1, 1921.

Application filed September 15, 1919. Serial No. 323,791.

*To all whom it may concern:*

Be it known that I, GEORGE V. PORZ, a citizen of the United States, resident of Cleveland, county of Cuyahoga, and State of Ohio, have invented new and useful Improvements in Means for Feeding and Cutting Ice-Cream, of which the following is a specification, the principle of the invention being herein explained and the best mode in which I have contemplated applying that principle, so as to distinguish it from other inventions.

My invention relates to machines for feeding and cutting ice cream. Particularly, my invention relates to means for cutting a large block of ice cream into portions serving to fill individual orders. The invention is particularly useful in so cutting varicolored or Neapolitan cream.

The annexed drawings and the following description set forth in detail certain means embodying my invention, the disclosed means, however, constituting but one of the various mechanical forms in which the principle of the invention may be employed.

In said annexed drawings:

Figure 1 represents a plan view of my invention;

Fig. 2 represents a side elevation thereof;

Figs. 2ª and 2ᵇ represent, respectively, a broken side elevation, partially in section, and an elevation of the open end of an ice cream container;

Fig. 3 represents a vertical longitudinal section taken in the plane indicated by the line III—III, Fig. 1;

Fig. 4 represents a right hand end elevation;

Fig. 5 represents a vertical transverse section taken in the plane indicated by the line V—V, Fig. 1;

Figs. 6 and 7 represent, respectively, side and end elevations of one of a series of long cutting blades hereinafter more fully described;

Figs. 8 and 9 represent, respectively, side and end elevations of one of a series of short cutting blades;

Figs. 10 and 11 represent, respectively, side and bottom plan views of said long and short blades assembled;

Fig. 12 represents a perspective of a block of cream after being cut into individual portions by means of my invention;

Figs. 13 and 14 represent, respectively, an end view and a section in the plane indicated by the line XIV—XIV, Fig. 13, of a hood utilized to prevent the cream from being displaced when certain separators serving to segregate the different colored creams are being withdrawn from the container into which the creams have been poured;

Figs. 15 and 16 represent, respectively, side and plan views of the separators before mentioned.

Referring to the annexed drawings, a base for my improved machine is indicated by the ordinal 1, upon which at one end in two brackets 2 and 3 is journaled a shaft 4 carrying at one end a gear 5 and at the other end four pulleys 6, 7, 8 and 9, of which pulleys 6 and 7 are power pulleys, direct and reverse, respectively, and 8 and 9 are idlers. Power is furnished from the pulley 12 and belts 10 and 11 connect said power pulley 12 with the sets of pulleys 6—8 and 7—9, respectively.

Opposite motions for the pulleys 6 and 7 are produced by means of crossing the belt 10. The gear 5 meshes with a gear 13 which is, in reality, a nut, being provided with an internal thread adapted to coöperate with a worm 20. This worm is mounted in two bearings 18 and 19, of which the bearing 18 is a movable one, being mounted upon two rods 16 and 17 which are supported in brackets 14 and 15. The screw 20 is formed with an outer hub portion 21 carrying a head 22 serving as a push plate for forcing a block of ice cream out of a container, as hereinafter fully described. It is evident that the actuation of the belt 10 in the direction indicated by the arrow in Fig. 2 will result in the outward movement of the screw 20 through the bearing 19, the bearing 18 sliding with the inner end of the screw upon the rods 16 and 17. Two belt shifters 23 and 25, respectively, are secured to the movable bearing 18, the same being provided with fingers 24 and 26, respectively, which, at or about the end of the outward movement of the screw 20, contact with the belts 10 and 11 respectively to shift the same onto the idler 8 and the active reverse pulley 7, respectively, resulting in the return movement of the screw. At or about the end of this return movement the belt 11 is shifted from the active reverse pulley 7 to the idler 9 by means of a finger 27, plainly shown in Fig. 2, so that both belts 10 and 11 then are running upon idler pulleys.

The forward movement of the bearing 18 results in the forward movement of a rod 28, Figs. 1 and 2, at the forward end of which is secured a member formed with a rack 29. The rack 29 coöperates with a gear 30 meshing with a gear 31 loosely mounted upon a shaft 33 supported in bearings formed in a frame 41. This frame 41 is supported by pillars 32 tied at their tops by members 46 and at their bottoms mounted in a platform 45 supported upon the main base 1. The shaft 33 is formed with a crank portion having a connecting rod 34 secured at its inner end to a movable frame 35 from which depend four pillars 36. To the bottom of these pillars 36 is secured a casting 37 adapted to support the cutting blades which will now be described. Referring to Figs. 6 to 12 inclusive, it will be noted that these cutting blades consist of two series of blades and, in the form of device herein described, and shown in the accompanying drawings, each series of blades consists of nine blades. One of these series are long blades and the other series comparatively short blades. The short blades 38 are provided with slits 38' of a width substantially equal to the thickness of the blades and the long blades 39 are provided with slits 39' of substantially the same thickness. The blades 38 and 39 are of substantially the same depth and are assembled by means of mounting the short cross blades 38 upon the long longitudinal blades 39, the tongues of the short blades 38 between the respective contiguous slits 38' being disposed between the respective contiguous long blades 39, as plainly shown in Figs. 10 and 11. It is evident that the proper actuation of an assembly of blades just described would result, during one cutting action, in the slicing of a block of cream, of the character shown in Fig. 12, into sixty-four portions, as plainly shown in said figure. Such an actuation of the assembled blades will now be described in detail.

As hereinbefore mentioned, the blades are supported upon the movable casting 37. In detail, this support consists in hooking the respective projecting shoulders $38^2$ and $39^2$, formed upon the bottom end portions of the blades 38 and 39, under the casting 37 and then securing the assembled blades to said casting by means of two end pins 40 passed through the long blades 39 and secured at their two ends in the casting 37, as plainly shown in Fig. 5. Secured to the shaft 33 exteriorly of the gear 31, is a ratchet 58 adapted to coöperate with a pawl 59 secured to the gear 31. It is evident that the actuation of the gear 30 in the direction indicated by the arrow in Fig. 2, due to the forward movement of the rack 29, will result in the actuation of the gear 31 in the direction indicated by the arrow in said figure, and that the pawl 59 will play idly over the ratchet 58 and there is no rotation of the shaft 33. The actuation of the gear 31 in the opposite direction, due to the retraction of the rack 29, will result in the movement of the ratchet 58, due to the action of the pawl 59, and the consequent rotation of the shaft 33. This will result in the movement of the casting 37 downwardly and upwardly and the cutting action of the blades 38 and 39.

Before the above-described cutting action has taken place, and during the forward movement of the screw 20 and rack 29, the large block of cream has been deposited upon a board 47 supported upon the platform 45 and upon which board the cream is later cut by the action hereinbefore described. This cream has been forced out of a can 50 by means of the head 22 during the forward movement of the screw 20. The cream has been contained in a box 50 which has been placed upon supporting brackets 51 mounted upon the main base 1. The forward movement of the box 50 has been prevented by means of bands 52, which contact with the respective supporting brackets 51.

During a complete rotation of the crank shaft 33, the casting 37 and the supported cutting blades have moved downwardly and upwardly. In order that the separated portions of cream 60 may not be carried upwardly or displaced by the upwardly moving blades 38 and 39, I provide strippers 49, plainly shown in Figs. 3 and 5, dependently supported from a platform 44, which is mounted upon a shoulder 48 of a frame 42, which in turn is supported by hangers 41 forming at their upper portions bearings for the crank shaft 33. The platform 44 is spaced from the frame 42 by four transverse stringers 43, plainly shown in Figs. 2 and 3. The whole stationary frame supporting the strippers 49 and forming bearings for the crank shaft 43 is supported upon the pillars 32 by means of the screw 61, plainly shown in Figs. 2, 3 and 5.

The block of cream illustrated in Fig. 12 is formed as follows: The box 50 is stood upon one end, formed by sheet metal plates 53 and 53, secured together by means of a screw 55 and separated by a leather gasket 54, by means of which any wear may be taken up and leakage prevented, and the three colors of cream poured into separate compartments formed by means of separators 56, Figs. $2^b$ and 15, mounted in slide ways 50' formed in the box 50. The separators 56 are then removed and, in order that this removal may not result in any displacement of the soft cream, a hood 57 is placed over the open end of the box 50, this hood having a shoulder portion 57' disposed over the contiguous lateral portion of the box and also two slits $57^2$ through which by a suitable instrument, such as a hook, the separators 56 may be withdrawn from the box 50.

What I claim is:

1. In means for feeding and cutting ice cream, the combination of a main support; a container for retaining a block of cream; means carried by the container for forming the block into a plurality of separate layers; means adapted to cut said block longitudinally and transversely simultaneously; means for forcing said block from said retainer and into juxtaposition to said cutting means; and means for operating said cutting means by the rearward movement of said forcing means.

2. In means for feeding and cutting ice cream, the combination of a main support, a container for retaining a block of cream; means adapted to cut said block longitudinally; means adapted to cut said block transversely; means for forcing said block from said container and into juxtaposition to said cutting means; means for operating said cutting means; and actuating means for said block-forcing means adapted to operate the cutting means by the rearward movement of the block forcing means.

3. In means for feeding and cutting ice cream, the combination of a main support; a stationary container for retaining a block of cream; means within the container for forming a plurality of separate layers therein; means adapted to cut said block longitudinally; means adapted to cut said block transversely; means for forcing said block entirely from said container and into juxtaposition to said cutting means; means for operating said cutting means and common actuating means for said block-forcing means and said cutter-operating means, said block-forcing means completing its forward movement before said cutting means commences its cutting movement.

4. In means for feeding and cutting ice cream, the combination of a main support; a feeding screw provided with a push-plate; means for reciprocating said screw; means for retaining a block of cream in the pathway of said push-plate, the forward movement of the latter being adapted to entirely displace said block from said retaining means; cutting means adapted to subdivide said block longitudinally; cutting means adapted to subdivide the longitudinal block portions; and means for simultaneously reciprocating both of said cutting means for cutting the entire block during a single operation, said cutting means commencing its forward movement when said screw commences its rearward movement.

5. In means for feeding and cutting ice cream, the combination of a main support; a feeding screw provided with a push-plate; means for reciprocating said screw; means for retaining a block of cream in the pathway of said push-plate, the forward movement of the latter being adapted to displace said block from said retaining means; a rack actuated by the movements of said screw; transmission members actuated by said rack; and a cutting member actuated by said transmission members, said cutting member being reciprocated toward and from said cream block, the arrangement being such that said cutting member exerts its cutting action after said screw terminates its forward movement.

6. In means for feeding and cutting ice cream, the combination of a main support; a feeding screw provided with a push-plate; means for reciprocating said screw; means for retaining a block of cream in the pathway of said push-plate, the forward movement of the latter being adapted to displace said block from said retaining means; a rack actuated by the movements of said screw; transmission members including a pawl and ratchet actuated by said rack; and a cutting member actuated by said transmission members, said cutting member being reciprocated toward and from said cream block, the arrangement being such that said cutting member is idle during the forward movement of said screw and completes its forward and rearward movements during the rearward movement of said screw.

7. Means for feeding and cutting ice cream, comprising a main support, a stationary container for a block of cream; means adapted to cut said block longitudinally; means adapted to cut said block transversely; reciprocating means for forcing said block from the container and into juxtaposition to said cutting means; and means actuated by the rearward movement of said reciprocating means for operating the cutting means.

8. Means for feeding and cutting ice cream, comprising a main support; a container for retaining a block of cream; means adapted to simultaneously cut the entire block longitudinally and transversely; reciprocating means for forcing said block from the container and into juxtaposition to said cutting means, and means controlled and operated by the rearward movement of said reciprocating means for actuating the cutting means.

Signed by me, this 29th day of August, 1919.

GEORGE V. PORZ.